United States Patent [19]

Flax

[11] 4,333,614
[45] Jun. 8, 1982

[54] WHIP FINISH KNOT TYING AID

[76] Inventor: Eli A. Flax, 33 Gillette Ave., Patchogue, N.Y. 11772

[21] Appl. No.: 160,839

[22] Filed: Jun. 18, 1980

[51] Int. Cl.³ .................. A01K 97/00; B65H 81/00
[52] U.S. Cl. ......................................... 242/1; 43/1; 57/10; 289/17
[58] Field of Search .............. 289/17; 43/1; 57/1 UN, 57/2.5, 4, 5, 10; 242/7.19, 1

[56] References Cited

U.S. PATENT DOCUMENTS 465,894 12/1891 Stone ....................................... 289/17
3,866,959 2/1975 Matarelli ................................. 289/17

FOREIGN PATENT DOCUMENTS 1158079 7/1969 United Kingdom ................. 289/17

Primary Examiner—Billy S. Taylor
Attorney, Agent, or Firm—Richard L. Miller

[57] ABSTRACT

A fixture for aid in whip-finishing a tying of a fly for rod fishing; the fixture including a stationary post upon a rigid base, a sleeve fitted on a top of the post and a stiff wire crank inserted transversely through the sleeve, one end of the crank having a handle for turning the crank, and the other end protruding from the sleeve having first a generally U-shaped loop and then a straight terminal end that is parallel to the sleeve axis.

7 Claims, 9 Drawing Figures

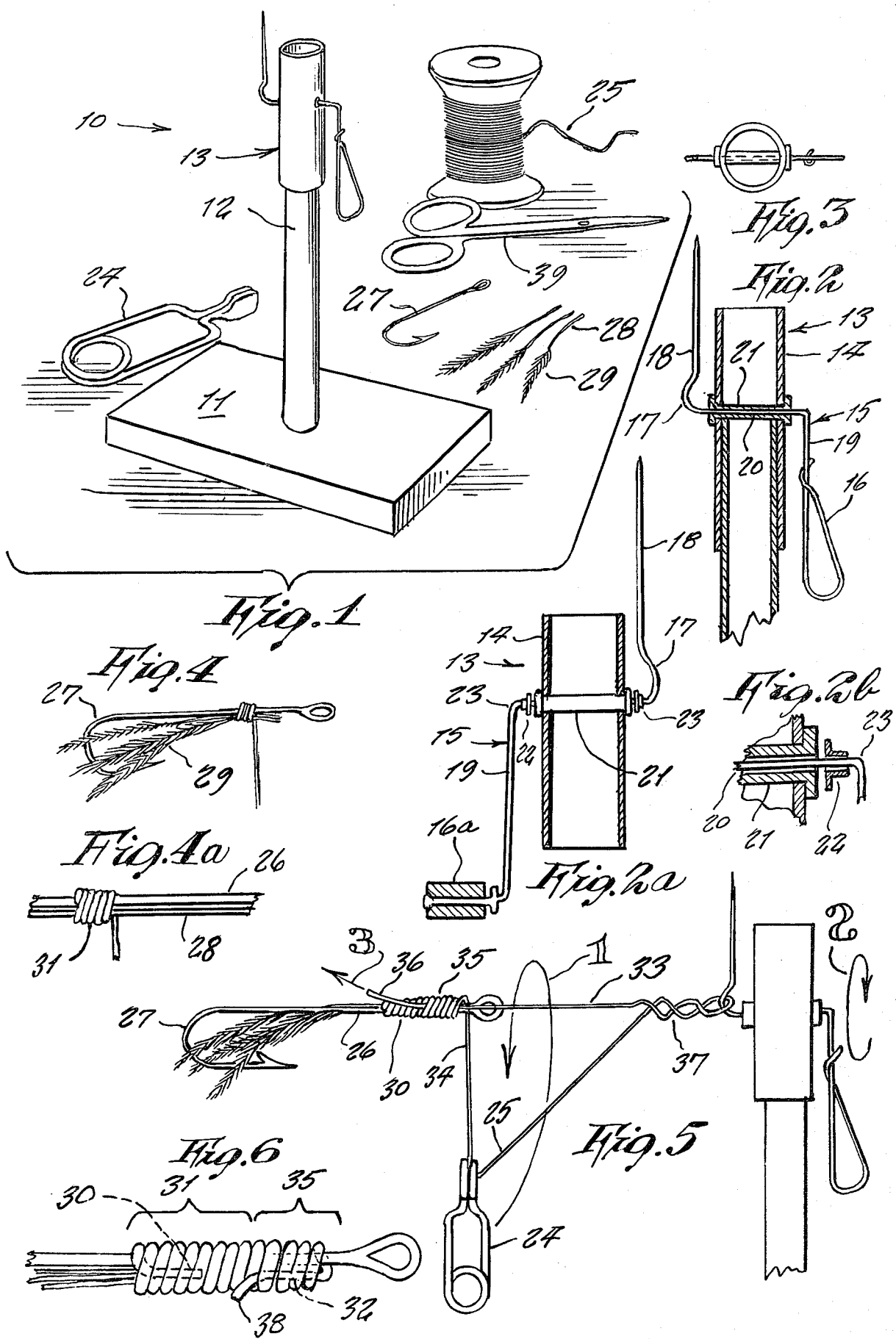

WHIP FINISH KNOT TYING AID

BACKGROUND OF THE INVENTION

It is well known to fishermen and others who tie flies for sport fishing, that it requires skill to whip-finish the tying, after the thread has been wrapped around the shank of the fishing hook and the hackle, as it is difficult to insert the tail end of the thread underneath the final thread turns so that it is hidden and locked from unwinding. Accordingly this situation is in need of an improvement.

SUMMARY OF THE INVENTION

Therefore it is a principal object of the present invention, to provide a fixture for aiding in whip-finishing a tying of an artificial fly on a fishing hook.

Another object is to provide a fixture which permits persons without the specific skill to whip-finish a tying of an artificial fly, with professional results.

Yet another object is to provide a fixture which allows the work to be done much more quickly and accordingly would be ideal for mass production of fly tying.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a perspective view of the invention together with accessories used therewith.

FIG. 2 is a side cross sectional view of the invention.

FIG. 2a is a similar view of a modified design thereof.

FIG. 2b is an enlarged detail thereof.

FIG. 3 is a top view of the invention.

FIG. 4 is a view showing an initial winding around a fish hook and fly material.

FIG. 4a is an enlarged detail thereof.

FIG. 5 is a side view showing the invention in use.

FIG. 6 is an enlarged view of the final whip finish knot.

DETAILED DESCRIPTION OF PREFERRED EMBODIMENTS

Referring now to the drawing in greater detail, the reference numeral 10 represents a fixture for aiding in whip-finishing a tying of an artificial fly, according to the present invention, wherein there is a flat base 11 for being rigidly placed upon any flat working area. An upright post 12 is mounted upon the base, and a removable mechanism 13 is mounted upon an upper end of the post.

The mechanism includes a metal sleeve 14 slided on the post. A crank 15 is inserted transversely through the sleeve, and is made of a stiff wire that is bent up into the specific shape shown in the drawing. One end of the crank is bent up so to form a crank handle 16 (as shown in FIG. 2) or else it is fitted with a freely rotatable crank handle 16a (as shown in FIG. 2a). The opposite end of the wire protruding outwardly of the sleeve is first bent into a generally U-shaped loop 17, and then a terminal end 18 thereof is bent at right angle from the loop so that it extends straight and parallel to the sleeve and in a direction that is opposite to the leg 19 of the crank handle. It is to be noted that the straight terminal end 18 may be tapered gently throughout its length toward the tip thereof.

The central leg 20 of the crank extending through the sleeve is shown, in FIGS. 2 and 2a, to extend through a bushing 21 which is either held force fitted in openings on opposite sides of the sleeve or else is riveted over as suggested in FIG. 2b. The leg 20 is freely rotatable in the bushing. A collar 22 may be either affixed or loosely fitted on opposite ends of the leg 20, as shown in FIG. 2a, so as to prevent the bend 23 at the ends of the leg from wearing against the ends of the bushing.

In use, the fixture is utilized together with a separate hackle clip 24 for being clamped along the gut or thread 25 that is used in serving around a shank 26 of a fishing hook 27 and around the pin ends 28 of fly feathers 29 or the like.

The steps in tying the fly to the fishhook, are shown in the generally successive stages illustrated in FIGS. 4 through 6. Initially, as shown in FIGS. 4 and 4a, one end 30 of the thread is laid alongside the fishhook and fly extending parallel to the axis thereof, and then the thread is wrapped therearound so to form closely adjacent turns 31 around the fishhook shank and fly covering up the thread end 30.

After a number of such turns 31 are made, they are held in place by holding them between the fingers of a person's hand, while the other hand then places an opposite end 32 of the thread along side the thread turns, the end 32 extending parallel to the end 30. An intermediate portion of the thread nearer the end 32 is then hooked around the loop 17 while an intermediate portion of the thread nearer the end 30 is then clamped in the hackle clip 24, as shown in FIG. 5.

Next, the hackle clip is flipped a number of times around the portion 33 of the thread as indicated by the numeral 1 in the figure so that the portion 34 of the thread thus winds up additional turns 35 around the fishhook shank, the fly and also around the end 32 of the thread, as also shown in the figure. It is to be noted that a tail 36 of the end 32 is left uncovered by the turns 35 so that later on it can be grasped and pulled in a subsequent step, as will be stated hereinafter.

After a number of the turns 35 are made, it will be noted that twists 37 in the thread will thus have occurred at the loop; one twist for each turn.

Then after enough turns 35 are made, the crank is turned so as to unwind the twists 37. Then the thread is lifted out of the loop 17, and the hackle clip 24 is removed from the thread. The tail 36 at end 32 is then pulled so that all the free thread adjacent the last-made turn is pulled tightly under the turns 35. The tail is then cut off at 38 by scissors 39 so that no free thread hangs from the whip-finished wrapping thus produced, as is further illustrated by numerals 2, and 3 in FIG. 5.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

I claim:

1. A fixture for aiding in whip-finishing a tying of an artificial fly on a fish hook, comprising, in combination, a supporting base for resting upon a surface, said supporting base having an upper face surface; an upright post extending perpendicularly from said upper face of said supporting post and affixed to said upper face; a sleeve telescopingly mounted about said post at the upper end of said post, said sleeve comprising a main elongated portion having a central aperture formed along the length thereof in which is received in sliding fashion the upper end of said post, a bushing mounted within said main elongated portion and traversing said central aperture along the width thereof, said bushing being positioned in said main elongated portion approximately midway between the ends thereof, said bushing resting on the uppermost portion of said upper end of said upright post so that a portion of said sleeve extends about said upper end of said upright post in telescoping fashion, and a portion of said sleeve extends upwardly from said upper end of said upright post, said bushing having a longitudinal axial passageway formed therethrough; and a crank means insertable through said sleeve and said bushing, said crank means comprising a horizontal leg portion which extends through said axial passageway in said bushing, a first vertical leg portion extending from one end of said horizontal leg portion and extending parallel with said central aperture of said sleeve, and a second vertical leg portion extending from the other end of said bushing and projecting in a direction opposite to said first leg portion, said second leg portion also extending parallel with said central aperture of said sleeve; said first leg portion constituting a means for grasping to rotate said crank; and said second leg portion comprising a bent curved portion adjacent said other end of said bushing, and a straight elongated portion projecting from said bent curved portion at the portion thereof distant from said other end of said bushing, said bent curved portion of said second leg portion defining a catching area for loops of thread twisted during the tying of the fly to the hook shank, said bent portion holding said twisted loops thereon so that said crank may be rotated to thereby untwist said twisted loops.

2. The fixture for aiding in whip-finishing a tying of an artificial fly on a fish hook according to claim 1, wherein said sleeve is removably mounted on said upper end of said upright post, said sleeve being supported on said upper end of said upright post by said bushing.

3. The fixture according to claim 2, wherein said straight elongated portion of said second leg portion comprises a tapered shank decreasing is diameter from adjacent said bent curved portion thereof to the outer tip of said second leg portion, whereby the untwisted loops caught in said bent curved portion may be easily removed from said second leg portion.

4. The fixture according to claim 3, wherein said bent curved portion has a portion thereof which bulges outwardly from a plane containing therein said elongated portion of said second leg portion to define a well for holding the twisted loops therein.

5. The fixture according to claim 4, wherein said sleeve is made of a hard metal, and said first leg portion of said crank comprises a means for gripping to aid in turning said crank.

6. The fixture according to claim 1, further comprising a pair of collars, each said collar being mounted on a respective end of said bushing, each said collar having an opening formed therethrough through which said horizontal leg portion extends, said horizontal leg portion being slidable therein so that wear of said crank means is reduced.

7. The fixture according to claim 6, wherein said bushing comprises a pair of end flanges for securing said bushing to the outer surface of said sleeve; and each said collar being positioned adjacent a respective one of said pair of end flanges in abutting relationship.

* * * * *